(12) United States Patent
Stewart

(10) Patent No.: US 11,553,990 B2
(45) Date of Patent: Jan. 17, 2023

(54) DENTAL APPLIANCE WITH DIFFERENTIAL PROPERTIES

(71) Applicant: Bay Materials LLC, Fremont, CA (US)

(72) Inventor: Ray F. Stewart, Redwood City, CA (US)

(73) Assignee: Bay Materials, LLC, Fremont, CA (US)

( * ) Notice: Subject to any disclaimer, the term of this patent is extended or adjusted under 35 U.S.C. 154(b) by 139 days.

(21) Appl. No.: 16/490,464

(22) PCT Filed: Mar. 1, 2018

(86) PCT No.: PCT/US2018/020511
§ 371 (c)(1),
(2) Date: Aug. 30, 2019

(87) PCT Pub. No.: WO2018/160875
PCT Pub. Date: Sep. 7, 2018

(65) Prior Publication Data
US 2020/0015937 A1    Jan. 16, 2020

Related U.S. Application Data

(60) Provisional application No. 62/465,824, filed on Mar. 2, 2017.

(51) Int. Cl.
*A61C 7/08* (2006.01)
*B32B 25/00* (2006.01)
*A61C 19/06* (2006.01)

(52) U.S. Cl.
CPC ............... *A61C 7/08* (2013.01); *B32B 25/00* (2013.01); *A61C 19/063* (2013.01)

(58) Field of Classification Search
CPC ..... A61C 7/00; A61C 7/08; A61C 5/90; A61B 71/085; A61F 5/566
USPC ................................ 433/6, 24; 128/861, 862
See application file for complete search history.

(56) References Cited

U.S. PATENT DOCUMENTS

| | | | |
|---|---|---|---|
| 4,032,627 A | | 6/1977 | Suchan et al. |
| 5,003,994 A | * | 4/1991 | Cook ................ A61F 5/566 |
| | | | 128/848 |
| 5,032,178 A | * | 7/1991 | Cornell ............... A61Q 11/00 |
| | | | 106/35 |

(Continued)

FOREIGN PATENT DOCUMENTS

| | | |
|---|---|---|
| WO | WO 2006/009745 A1 | 1/2006 |
| WO | WO 2013/130552 A1 | 9/2013 |
| WO | WO 2018/160875 A1 | 9/2018 |

OTHER PUBLICATIONS

Choi, Sung-Hwan & Kim, Jung & Kim, Cheol-Soon & Yu, Hyung-Seog & Hwang, Chung-Ju. (2017). Cone-beam computed tomography for the assessment of root-crown ratios of the maxillary and mandibular incisors in a Korean population. The Korean Journal of Orthodontics. 47. 39. 10.4041/kjod.2017.47.1.39. (Year: 2017).*

(Continued)

*Primary Examiner* — Matthew M Nelson
(74) *Attorney, Agent, or Firm* — Gerald T. Gray; Leydig, Voit & Mayer, Ltd.

(57) ABSTRACT

Described are improved dental materials and appliances made therefrom that have a range of flexibility and strength and exhibit improved comfort and effectiveness in orthodontic and other treatment.

15 Claims, 5 Drawing Sheets

(56) References Cited

U.S. PATENT DOCUMENTS

| | | | |
|---|---|---|---|
| 5,975,893 A | 11/1999 | Chishti et al. | |
| 6,089,869 A | 7/2000 | Schwartz | |
| 6,274,122 B1* | 8/2001 | McLaughlin | A61C 19/063 |
| | | | 128/860 |
| 6,343,933 B1 | 2/2002 | Montgomery et al. | |
| 6,354,837 B1 | 3/2002 | Jensen | |
| 6,368,576 B1 | 4/2002 | Jensen et al. | |
| 6,454,565 B2 | 9/2002 | Phan et al. | |
| 6,503,485 B1 | 1/2003 | Allred | |
| 6,524,101 B1 | 2/2003 | Phan et al. | |
| 6,843,981 B1 | 1/2005 | Ishibashi et al. | |
| 6,986,883 B2 | 1/2006 | Pellico | |
| 7,255,561 B2 | 8/2007 | Tricca et al. | |
| 8,656,926 B2* | 2/2014 | Doctors | A61F 5/566 |
| | | | 128/862 |
| 8,986,003 B2 | 3/2015 | Valoir | |
| 9,138,298 B2 | 9/2015 | Rudo | |
| 2001/0041320 A1* | 11/2001 | Phan | B29C 51/002 |
| | | | 433/6 |
| 2003/0104341 A1* | 6/2003 | Zavitsanos | A61K 8/22 |
| | | | 433/215 |
| 2003/0205234 A1* | 11/2003 | Bardach | A63B 71/085 |
| | | | 128/861 |
| 2005/0175552 A1 | 8/2005 | Hoic et al. | |
| 2007/0086960 A1 | 8/2007 | Tarver et al. | |
| 2008/0044786 A1 | 2/2008 | Kalili | |
| 2009/0298006 A1 | 12/2009 | Schwartz | |
| 2010/0186756 A1* | 7/2010 | Koizumi | A63B 71/085 |
| | | | 128/861 |
| 2011/0088703 A1 | 4/2011 | Ambis, Jr. | |
| 2011/0171606 A1* | 7/2011 | Lewis | A61C 19/06 |
| | | | 433/217.1 |
| 2011/0179851 A1 | 7/2011 | Mack et al. | |
| 2013/0078594 A1* | 3/2013 | Leslie-Martin | A61C 7/08 |
| | | | 433/6 |
| 2013/0089828 A1* | 4/2013 | Borovinskih | A61C 7/08 |
| | | | 433/6 |
| 2013/0263416 A1* | 10/2013 | Wahab | A61C 11/08 |
| | | | 29/271 |
| 2013/0302742 A1* | 11/2013 | Li | B32B 27/32 |
| | | | 433/6 |
| 2014/0072926 A1 | 3/2014 | Valoir | |
| 2015/0059769 A1* | 3/2015 | Powers | A41D 13/015 |
| | | | 128/861 |
| 2015/0079532 A1 | 3/2015 | Pechersky | |
| 2015/0374464 A1 | 12/2015 | Stewart | |
| 2016/0081768 A1* | 3/2016 | Kopelman | A61C 7/10 |
| | | | 433/6 |

OTHER PUBLICATIONS

International Search Report from International Application No. PCT/US2018/020511, 2 pages, dated May 16, 2018, Application now published as International Publication No. WO2018/160875, published Sep. 7, 2018.

Ovejero et al., "Wet Peroxide Oxidation of Phenolic Solutions over Different Iron-Containing Zeolitic Materials", Ind. Eng. Chem. Res., vol. 40, No. 18, pp. 3921-3928 (2001).

* cited by examiner

DENTAL APPLIANCE WITH DIFFERENTIAL PROPERTIES

CROSS-REFERENCE TO RELATED APPLICATIONS

This application is a U.S. National Stage Application under 35 U.S.C. § 371 which claims the benefit of priority to International Patent Application No. PCT/US2018/020511, filed Mar. 1, 2018, which claims the benefit of priority to Provisional Patent Application No. 62/465,824 filed Mar. 2, 2017, each of which is hereby incorporated by reference in its entirety.

TECHNICAL FIELD

The disclosure relates to improved dental materials and dental appliances made therefrom.

BACKGROUND

Much effort and expense has been expended in order to modify the appearance or function of a person's teeth. Some dental appliances are purely cosmetic, others are designed to induce movement of the teeth. Some dental appliances are shells comprising transparent plastics including polycarbonate, polyurethane, polyesters or other rigid plastics. Orthodontic retainers are used to maintain teeth in a specific alignment, typically after tooth straightening orthodontic procedures and utilize a combination of plastics and metal components (Hawley Retainer).

A number of useful dental appliances are produced by forming a shell adapted to fit over one or more teeth, for example orthodontic tooth positioners or aligners, as described in: Chisti et al., U.S. Pat. No. 5,975,893, Phan, et al., U.S. Pat. No. 6,524,101, Tricca et al., U.S. Pat. No. 7,255,561; retainers, as described in: Anderson, WO 2006009745, Stewart, WO 2013130552; mouth guards, as described in: Mack, US Patent Publication No. 20110179851, Ambis, 20110088703; bleaching trays, as described in: Schwartz, U.S. Pat. No. 6,089,869, Jensen, U.S. Pat. No. 6,354,837, and dental splints or night guards, as described in: Schwartz, US Patent Publication No. 20090298006. U.S. Pat. No. 6,454,565 discloses methods and constructions to produce devices having different mechanical properties in different areas. U.S. Pat. No. 9,138,298 discloses a dental aligner incorporating reinforcing fabric in selected regions to modify forces on teeth to facilitate movement. U.S. Pat. No. 8,986,003 discloses an aligner made of a polyurethane resin wherein at least the facial surfaces are a pearlescent white color. The entire disclosure of each of those patents and publications is incorporated herein by reference for all purposes.

Such devices may be conveniently manufactured by one of several methods including thermoforming, subtractive machining, additive (3D) printing or by other known methods or combinations of methods.

Some dental appliances function to impart substantial force on the teeth and can prevent tooth movement or lessen mechanical impact to teeth. The rigidity of such a polymeric appliance is a result of the modulus of the thermoformable polymer materials from which it is made. The higher the modulus of the materials, the more rigid the appliance. However, the more rigid the appliance, the more difficult it is to fit it over the teeth and the less comfortable it is for the wearer. In addition, the polymeric shells may be degraded by the environment in the oral cavity and lose their effectiveness over time in terms of mechanical properties or aesthetics.

Dental appliances comprising a laminar shell composed of at least two layers, with at least a portion of the innermost layer configured to engage individual teeth and the outermost layer having a lower elastic modulus than the inner layer have been described. Such appliances impart different forces to the immediately underlying teeth, for example the portion of the appliance covering the molars imparts a different force than portions of the appliance covering the remainder of the teeth.

Dental appliances have also been described that comprise a laminar shell having an inner layer and an outer layer, wherein the inner layer includes at least two segments which conform to individual teeth or groups of teeth, and the outer layer joins segments of the inner layer together, wherein the outer layer has a lower modulus of elasticity than the inner layer.

Dental appliances for delivery of substances to teeth or gums concurrently with the realignment of teeth using elastic polymeric shells have been described. The substance is provided in active form in or on a carrier or binder, encapsulated in the device or microencapsulated in a polymer material used to make the shell. Exemplary agents include, antibiotics, bleaching materials such as carbamide peroxide, fluoride, breath fresheners and the like. Currently available options to improve the appearance of teeth have substantial disadvantages. Many cosmetic procedures make use of bleaching agents which are applied directly to the teeth. Such bleaching agents can damage the natural tooth structure itself and/or can produce inconsistent cosmetic effects or stains on the natural tooth structure and/or fillings or crowns. Other proposed cosmetic procedures make use of treatments which form a coating over the teeth. Such treatments are difficult to apply uniformly and accurately, often degrade relatively rapidly, and can be difficult to remove. Cosmetic options for improving the appearance of teeth are described for example, in U.S. Pat. Nos. 4,032,627; 6,343,933; 6,368,576; 6,503,485; and 6,986,883, and US Patent Publication Nos. 20050175552 and 20070086960, the entire disclosure of each of which is incorporated herein by reference for all purposes.

Although there are many dental appliances on the market and a variety of features are available, there remains a need for dental appliances that have a range of flexibility, that retain strength and exhibit improved effectiveness in orthodontic treatment. Also, of interest are dental appliances that provide a more natural appearance, are more comfortable for the individual wearing the dental appliance, and/or are useful for administration of therapeutic or cosmetic treatment modalities.

BRIEF SUMMARY

In a first aspect, improved dental appliances comprising a first or innermost component and a second or outermost component, which may be made of the same materials, similar materials, or different materials, are provided. The innermost component and the outermost components of the dental appliance may be attached or laminated to one another.

In one embodiment, at least a portion of the material conforming to the gingival area (A2) may be trimmed to the gum line, or trimmed to approximately 0.5 mm, 1 mm, 2 mm, 3 mm, 4 mm, and 5 mm, 0.5 to 1.5 mm, 1 to 2.5 mm, 2 to 3 mm, or 3 to 4 mm over (beyond) the gum line.

In other embodiments, at least a portion of the dental appliance material that conforms to the gingival area (MA2) has one or more different material properties than at least a portion of the material that conforms to at least a portion of the teeth (MA1). The material properties may be one or more of a mechanical, optical, electrical, physical, chemical and a biochemical property.

In some embodiments, the material property may be one or more of: (1) the mechanical property of modulus where the modulus of M1A is greater than or equal to the modulus of MA2; (2) the optical property of light transmission, reflection, anti-glare, gloss control, haze or color; (3) the physical property of oxygen permeability where the oxygen permeability of MA2 is greater than the oxygen permeability of MA1; (4) the physical property of fluid permeability where the fluid permeability of MA1 is greater than the fluid permeability of MA2; (5) the biochemical property of antibacterial activity, and the antibacterial activity of MA1 is greater than the antibacterial activity of MA2; (6) the biochemical property of calcium binding, where the calcium binding activity of MA1 is greater than the calcium binding capacity of MA2; (7) the chemical property of catalytic activity for decomposition of a peroxy compound; and (8) the chemical property of photocatalytic activity.

In other aspects, a dental appliance comprising a polymeric shell adapted to fit over teeth wherein the dental appliance comprises the chemical property of catalytic activity is provided. The catalytic activity may be decomposition of a peroxy compound or photocatalytic activity.

DETAILED DESCRIPTION

Figure 1:
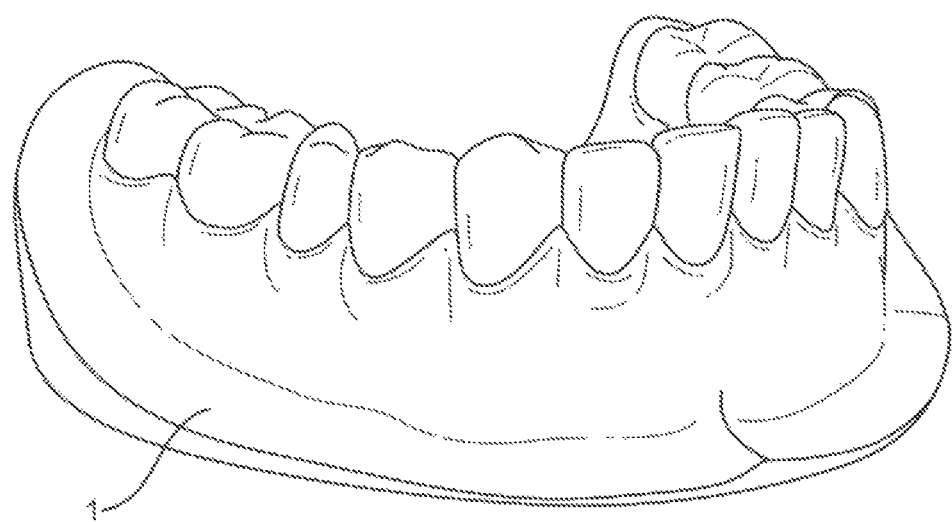
FIG. 1 is a schematic depiction of a cast model of the teeth of an individual.

All patents, publications, and patent applications cited in this specification are herein incorporated by reference as if each individual patent, publication, or patent application was specifically and individually indicated to be incorporated by reference in its entirety for all purposes.

Definitions

Unless defined otherwise, all technical and scientific terms used herein have the same meaning as commonly understood by one of ordinary skill in the art to which the subject matter pertains. Although other methods and materials similar, or equivalent, to those described herein can be used in the practice of the present subject matter, the preferred materials and methods are described herein.

In describing and claiming the present subject matter, the following terminology will be used in accordance with the definitions set out below.

As used in this specification and the appended claims, the singular forms "a," "an" and "the" include plural referents unless the context clearly dictates otherwise.

The term A1' is used herein with reference to a portion of teeth, e.g., two or more teeth, for example, 2, 3, 4, 5, 6, 7, 8, 9, 10, 11, 12, 13, 14 or 15 teeth for each of the upper and lower jaw.

The term "A2" is used herein with reference to a gingival region corresponding to (or adjacent) the portion of the teeth identified by "A1".

Unless otherwise noted, the term "color measurement" is used herein to refer to measurements made using the LAB CIE color scale wherein L refers to total reflected light, A refers to the Red (+)-Green (−) color Axis and B refers the Yellow (+)-Blue (−) color axis measured using a D65 light source (daylight). However, color can also be measured using the CYMK scale which makes use of digital images. Other color measurement systems are known, and any suitable method may be used in evaluating products described herein.

The term "dental appliance" is used herein with reference to any device placed in or on the teeth of a subject. Dental appliances include but are not limited to orthodontic, prosthetic, retaining, snoring/airway, cosmetic, therapeutic and habit-modification devices.

The term "dye" is used herein to denote a coloring agent that is soluble or molecularly dispersed in a polymer.

The term "elastic modulus" is used herein with reference to the rigidity of a material and/or resistance of the material to elastic deformation. The higher the elastic modulus of the material, the more rigid.

The term "fluorescent agent" is used herein to denote a material that absorbs light in one region of the spectrum and emits light in the same or different region of the spectrum. The emission may be almost immediate or may be delayed. The fluorescent agent is selected from the group consisting of triazinestilbenes, coumarins, imidazolines, diazoles, triazoles, benzyloxazolines, and biphenyl-stilbenes or other fluorescent agents.

The term "gum line" is referred to herein as the line separating the gum (or gingiva) from the exposed part of the tooth.

The term "incident light" is used herein to denote light which shines onto an object and which may be reflected, scattered or least partially absorbed by the object.

The term "light scattering particles" is used herein to denote particles having a size from about 0.2 to about 20 μ and which are transparent or substantially white. By white is meant that the particles do not absorb significant amounts of light in the range from about 400 nm to about 700 nm.

The term "light transmission" is used herein to denote the amount of light passing through a sample. Unless otherwise stated, transmission refers to visible light as measured by a method similar to ASTM D1003-11 Standard Test Method for Haze and Luminous Transmittance of Transparent Plastics. Light transmission may also be measured using a colorimeter and a white reference sample, in which case the measurement includes two passages of light through the sample. Other measurements may be used, and specific methods reported based on equipment used and sample characteristics.

The term "MA1" is used herein with reference to a material conforming to at least a portion of the teeth.

The term "MA2" is used herein with reference to a material conforming to at least part of the gingival area. MA2 has at least one different material property than MA2.

The term "material properties" is used herein with reference to properties selected from the group consisting of mechanical, optical, chemical, physical, electrical and biochemical properties.

The term "optical additive" is used herein to mean an additive which substantially changes the color or light transmission properties of the polymeric material. An optical additive comprises one or more of a pigment, a dye, light scattering or absorbing particles and a fluorescent material with optical properties.

The term "pigment" is used herein to denote a solid particulate coloring agent which can be mixed with a polymer or a mixture of more than one polymer. The polymer(s) may be selected from the group consisting of elastomers, polyesters, polyurethanes, polyolefins, acrylic resins, methacrylic resins, polyamides, polycarbonates, polyethers, ionomer raisins, cellulose esters, cellulose ethers, and fluoropolymers, examples of which are listed in Table 5.

The term "reflected light" is used herein to denote incident light which reflects off the surface of an object after impinging on the object.

The term "scattered light" is used herein to denote light which diverges from a straight path after it has impinged on an object.

The term "shell" is used herein with reference to polymeric shells which fit over the teeth and are removably placeable over the teeth.

The term "stain resistant" is used herein with reference to a material designed to be resistant to being stained.

The term "thermoplastic polymer" is used herein to denote a polymer which is relatively hard at a lower temperature, which becomes relatively soft when subjected to heat and pressure, and again becomes relatively hard when cooled, provided that the heat and pressure do not chemically decompose the polymer.

The term "thermosetting polymer" is used herein to denote a polymeric material which is a solid or viscous material at a relatively low temperature and which, when subjected to heat and/or suitable radiation, and/or when the material undergoes one or more chemical reactions, changes irreversibly into an infusible polymer network. The term thermoset polymer is used to denote a cured thermosetting polymer.

The terms "tooth" and "teeth" include natural teeth, including natural teeth which have been modified by fillings or by crowns, implanted teeth, artificial teeth that are part of a bridge or other fitting secured to one or more natural or implanted teeth, and artificial teeth that are part of a removable fitting.

The term "trimmed to the gum line" is used herein to mean that at least a portion of a dental appliance or shell is formed, trimmed (or cut) to track the line where the gum meets the tooth (i.e., the gingival line or gingival margin).

The term "functional effect" is used to mean that the dental appliance does not have a purely cosmetic function. It is to be understood, however, that the shell may also improve the appearance of the teeth.

Dental Appliances

Current aligner systems available from a number of suppliers include a series of clear or transparent polymeric aligners that are removably positioned over the teeth. The patient wears a first aligner for a period of several days or longer, then removes the first aligner and replaces it with a second aligner. Each aligner is responsible for moving the teeth toward their final predetermined or aesthetically correct position. Patients undergoing this treatment often experience both significant discomfort and the aligners often fail to move one or more of the patient's teeth to the prescribed location. This can require the treatment process to be adjusted, resulting in delay, additional visits to the orthodontist's office and extended treatment time, as well as increased cost and discomfort for the patient. There is a need for a more effective polymeric dental appliance that provides strength and flexibility and fits tightly yet comfortably over the teeth. A further need exists for dental appliances that provide a good appearance consistent with the patient's normal teeth and that can provide a therapeutic or cosmetic treatment to the teeth over an extended period of time.

At times it may be desirable that an aligner have different material properties in different regions of the dental appliance. In one aspect, an appliance is prepared by thermoforming one or more thermoplastic components over a model of the patient's teeth.

When the appliances are constructed by thermoforming thin sheets (typically with a thickness of from about 0.25 to about 4 mm), the thermoformed device will be removed from the model and the excess material trimmed. Trimming may be done at the gum line closely following the shape of teeth (FIG. 1) or somewhat below (beyond) the gum line such that the device covers part of the gingiva (FIG. 2). Studies disclosed herein have shown that aligners which are trimmed approximately 1-2 mm below (beyond) the gum line are more effective in retaining strength and moving teeth than comparable aligners trimmed at or very near the gum line. Additionally, the inventors have found that appliances trimmed at the gum line are more prone to breakage and can be more irritating to the patient than devices that extend below (beyond) the gum line.

It might therefore seem prudent to always trim beyond the gum line. The inventors found that additional problems may be created by trimming a device beyond the gum line. The materials used to construct aligners (typically a polyester resin or polyurethane) are rigid and inflexible making removal difficult. Additionally, such aligners suffer from low oxygen permeability.

Bleaching trays are used to hold a tooth whitening agent (typically hydrogen peroxide or carbamide peroxide) adjacent to tooth surfaces. However, because these trays are trimmed below (beyond) the gum line, the gingival area is subjected to harsh bleaching agents which may cause irritation or damage to the gum tissue.

Balancing the properties of a dental appliance so that it performs adequately for both tooth structures and gingival areas of a patient is therefore difficult.

Through extensive experimentation and evaluation, the inventors have discovered a new, useful and cost-effective device construction that allows optimization of dental appliance properties for both tooth regions and gingival regions whereby total device performance can be readily optimized.

In some embodiments, a dental appliance comprises two or more materials adapted to conform to at least a portion of teeth (A1) and to at least a portion of a corresponding gingival region (A2), wherein at least a portion of the material(s) conforming to a portion of the teeth (MA1), and a material conforming to at least a portion of the gingival area (MA2), differ in at least one material property selected from a mechanical, optical, electrical, physical, chemical or biochemical property.

In some embodiments, the dental appliance comprises at least an inner and outer component. The inner and outer components may comprise distinct or different materials and there may or may not be a distinct dividing line between them. The components may or may not be layers. When the components are layers, each layer may comprise a different material.

The components of a dental appliance may different in a mechanical property, e.g., elastic modulus, and/or other mechanical properties. Elastic modulus is a measure of how well a material resists deformation. If a sample has a high modulus, it resists deformation. If a sample has a low modulus, it is easily deformed.

In some embodiments, the elastic modulus of a material is enhanced or otherwise modified by inclusion of an additive, for example, $CaCO_3$, talc, $TiO_2$, glass, diamond or a polymer powder or by methods such as layering, coating, treating the material or appliance with a chemical agent, or altering the temperature.

Typically, a dental appliance will have an elastic modulus of from 0.5 to 5 GigaPascal (GPa), for example, 0.5 GPa, 0.6 GPa, 0.7 GPa, 0.8 GPa, 0.9 GPa, 1.0 GPa, 1.1 GPa, 1.2 GPa, 1.3 GPa, 1.4 GPa, 1.5 GPa, 1.6 GPa, 1.7 GPa, 1.8 GPa, 1.9 GPa, 2.0 GPa, 2.1 GPa, 2.2 GPa, 2.3 GPa, 2.4 GPa, 2.5 GPa, 2.6 GPa, 2.7 GPa, 2.8 GPa, 2.9 GPa, 3.0 GPa, 3.1 GPa, 3.2 GPa, 3.3 GPa, 3.4 GPa, 3.5 GPa, 3.6 GPa, 3.7 GPa, 3.8 GPa, 3.9 GPa, 4.0 GPa, 4.1 GPa, 4.2 GPa, 4.3 GPa, 4.4 GPa, 4.5 GPa, 4.6 GPa, 4.7 GPa, 4.8 GPa, 4.9 GPa, 5.0 GPa, from 0.5 to 1.0 GPa, from 1.0 to 2.0 GPa, from 2.0 to 3.0 GPa, from 3.0 to 4.0 GPa, or from 4.0 to 5.0 GPa.

In some embodiments, the modulus of material (MA1), which covers the teeth is 1.5 times, 2 times, 3 times, 4 times, 5 times, 6 times, 7 times, 8 times, 9 times, 10 times, from 1 to 2 times, from 2 to 3 times, from 3 to 4 times, from 4 to 5 times, from 5 to 6 times, from 6 to 7 times, from 7 to 8 times, from 8 to 9 times, or from 9 to 10 times the modulus of material (MA2), which covers the gingival area.

In some embodiments, the modulus of material (MA1), which covers the teeth, is the same as the modulus of material (MA2), which covers the gingival area.

In some embodiments, the modulus of material (MA2), which covers the gingival area is 1.5 times, 2 times, 3 times, 4 times, 5 times, 6 times, 7 times, 8 times, 9 times, 10 times, from 1 to 2 times, from 2 to 3 times, from 3 to 4 times, from 4 to 5 times, from 5 to 6 times, from 6 to 7 times, from 7 to 8 times, from 8 to 9 times, or from 9 to 10 times greater than the modulus of material (MA1), which covers the teeth.

Optical properties include but are not limited to visible light transmission, reflectivity, anti-glare, gloss control, and haze and color. See, e.g., US Patent Publication No. 20150374464, expressly incorporated by reference herein.

The polymeric composition can contain a single optical additive or a mixture of two or more optical additives. The polymeric material can contain other additives which are not optical additives. The optical additives may be one or more optical additives selected from the group consisting of pigments, dyes, light scattering particles and fluorescent materials.

In some embodiments, the light transmission of MA1 is less than MA2. In some embodiments, the light transmission of MA1 is less than 80%, less than 70%, less than 60%, less than 50%, 70-80%, 60-70%, 50-60%, 40-50%, 30-40%, or 20-30% and the light transmission of MA2 is greater than 70%, greater than 80%, greater than 85%, greater than 90%, 70-80%, 80-90%, 90-95%, or 95-100%.

In some embodiments, the haze value of MA1 is greater than MA2. In some embodiments, the haze value of MA1 is less than 10 and the haze value of MA2 is greater than 10.

In some embodiments, the material(s) containing an optical additive can optionally have one or both of the following characteristics: (1) absorption of light within the range of about 550 to about 700 nm; or (2) when measured on a reference white color tile using the CIELAB color scale values for the combination of the white color tile and the material have an L value of between about 80 and 95, an A value from about −2 to +2 and a B value is from about +2 to −10. See, e.g., US Patent Publication No. 20150374464, expressly incorporated by reference herein in its entirety.

In some embodiments, the material(s) containing an optical additive when measured on a reference black color tile, can alter the perceived color of the black color tile when measured using a Byk Gardner Colorimeter as follows. Color measurement was made directly on the black tile and the CIELAB color scale values were recorded. Next, a thin film of water was applied to the color tile and the test film was laid onto the tile and gently smoothed to remove excess water to provide good optical coupling between the film and the color tile. The color measurements were then repeated, measuring on the combined structure and the LAB color values recorded, as shown in Tables 1 and 2.

TABLE 1

Film Composition, Structure and Measured Color
Values on Black Color Tile.
Color Readings on Black Color Tile

| L | A | B | Delta L | Delta B |
|---|---|---|---|---|
| 15-70 | 0.5-3.0 | less than 5 | greater than 10 | −4 |
| 15-25 | 0.5-1.0 | less than 4 | greater than 20 | −5 |
| 25-35 | 0.75-1.25 | less than 3 | greater than 25 | −6 |
| 30-40 | 1.0-1.5 | less than 2 | greater than 30 | −7 |
| 35-45 | 1.25-1.75 | less than 1 | 10-40 | −8 |
| 40-50 | 1.5-2.0 | less than 0 | 10-20 | −4 to −10 |
| 45-55 | 1.75-2.25 | less than −1 | 15-25 | −4 to −6 |
| 50-60 | 2.0-2.5 | less than −2 | 20-30 | −6 to −8 |
| 55-65 | 2.25-2.75 | less than −3 | 25-35 | −7 to −9 |
| 60-70 | 2.5-3 | less than −4 | 30-40 | −8 to −10 |

TABLE 2

Film Composition, Structure and Measured Color
Values on Yellow Color Tile.
Color Readings on Yellow Color Tile

| L | A | B | Delta L | Delta B |
|---|---|---|---|---|
| 50-100 | 0.5-5 | 5-35 | greater than 1 | −5 to −15 |
| 55-65 | 1.5-2.0 | 5-10 | greater than 3 | −7 to −13 |
| 60-70 | 2.0-2.5 | 10-15 | greater than 5 | −8 to −14 |
| 65-75 | 2.25-2.75 | 15-20 | greater than 7 | −5 |
| 70-80 | 2.5-3 | 20-25 | greater than 9 | −6 |
| 75-85 | 2.75-3.25 | 25-30 | 1-3 | −7 |
| 80-90 | 3.25-3.75 | 30-35 | 1-5 | −8 |
| 90-95 | 3.75-4.25 | | 2-7 | −9 |
| | 4.0-5.0 | | 3-9 | −10 |

In some embodiments, the materials increase the "brightness" as shown by the L values—decrease the yellowness of the tiles as shown by the B values.

In some embodiments, the materials have a visible light transmission of greater than 50%, 60%, 70%, or 75%.

In some embodiments, the materials have an incident light reflection of greater than 20%, 25%, 35%, 45%, 55%, 60%, or less than 80%, 70%, 60%, 50%, 40%.

In some embodiments, the dental appliance is adapted to fit over one or more teeth and at least a portion of the gum wherein a portion of the dental appliance covering at least a portion of a tooth exhibits a whitening effect and a portion covering the gum is substantially transparent.

In some embodiments, differential electrical fields may be applied to teeth and/or underlying tissue to facilitate tooth movement. In some embodiments, the electrical conductivity of MA1 is higher than MA2. In some embodiments the electrical conductivity of MA1 is lower than MA2. In some embodiments one or more materials has a differential piezo-electrical activity than another material.

In some embodiments, the dental appliances described herein are used for orthodontic treatment while concurrently providing a dental/periodontal therapy or a cosmetic treatment modality. Such treatments are traditionally provided with the use of a variety of accessories and devices applied when the repositioning appliance is removed from the patient's mouth.

Bleaching trays are used to hold a tooth whitening agent (typically hydrogen peroxide or carbamide peroxide) adjacent to tooth surfaces. However, because these trays are trimmed below (beyond) the gum line the gingival area is subjected to harsh bleaching agents which may cause irritation or damage to gum tissue.

In some embodiments, the dental appliances described herein incorporate a dental/periodontal or cosmetic treatment modality into or on the innermost component of the dental appliance. In some aspects of this embodiment, as exemplified in FIGS. 5A and B, the dental appliance comprises a laminated structure where a second or outermost polymeric material is trimmed approximately 2 mm beyond the gum line, either conforming to the edge of the teeth or having a substantially straight edge and extending beyond the gum line, but not directly conforming to the contours of the teeth.

In some embodiments, the dental/periodontal or cosmetic treatment modality is provided in a form that must be activated in order for it to be effective.

In some embodiments, the dental appliance comprises a dental/periodontal or cosmetic treatment modality in the form of a decomposition catalyst.

The decomposition catalyst activity is for decomposition of a peroxy compound and is present in the innermost portion of the dental appliance that conforms to the teeth or conforms to the teeth and the gums.

In some embodiments, the dental appliance comprises a single material comprising a decomposition catalyst and the material is (a) not trimmed; (b) trimmed to the gum line; or (3) trimmed approximately 2 mm beyond the gum line, either conforming to the edge of the teeth or having a substantially straight edge and extending beyond the gum line, but not directly conforming to the contours of the teeth.

In some embodiments, the dental appliance comprises more than one material comprising a decomposition catalyst and the material is: (a) not trimmed; (b) trimmed to the gum line; or (3) trimmed approximately 2 mm beyond the gum line, either conforming to the edge of the teeth or having a substantially straight edge and extending beyond the gum line, but not directly conforming to the contours of the teeth.

In some embodiments, the catalytic activity is derived from Zeolite Socony Mobil-5 (Zeolite SM-5), an aluminosilicate zeolite belonging to the pentasil family of zeolites. The chemical formula is $Na_nAl_nSi_{96-n}O_{192} \cdot 16H_2O$ (0<n<27) and it is available from multiple sources. This Zeolite is insoluble, non-toxic, and known to catalyze the decomposition of peroxides such as hydrogen peroxide producing oxidizing species including hydroxy radicals. See, e.g., Gabriel Ovejero et al, *Ind. Eng. Chem. Res.*, 2001, 40 (18), pp 3921-3928, entitled, "Wet Peroxide Oxidation of Phenolic Solutions over Different Iron-Containing Zeolitic Materials".

In some embodiments, the catalytic activity is derived from one or more of an iron, nickel or manganese compound.

In some embodiments, the catalytic activity is derived from a heterogeneous catalyst or magnetically separable iron mixed oxides such as (Co(II), Cu(II), Mn(II) ferrite and magnetite.

In some embodiments, the dental appliance comprises a dental/periodontal or cosmetic treatment modality in the form of a photocatalytic agent.

The photocatalytic agent is present in the innermost portion of the dental appliance that conforms to the teeth or conforms to the teeth and the gums.

In some embodiments, the dental appliance comprises a single material comprising a photocatalytic agent and the material is (a) not trimmed; (b) trimmed to the gum line; or (3) trimmed approximately 2 mm beyond the gum line, either conforming to the edge of the teeth or having a substantially straight edge and extending beyond the gum line, but not directly conforming to the contours of the teeth.

In some embodiments, the dental appliance comprises more than one material and the material comprising a photocatalytic agent is: (a) not trimmed; (b) trimmed to the gum line; or (3) trimmed approximately 2 mm beyond the gum line, either conforming to the edge of the teeth or having a substantially straight edge and extending beyond the gum line, but not directly conforming to the contours of the teeth.

In some embodiments, the photocatalyst is comprised of a finely divided titanium dioxide, $CuO$—$SnO_2$, $ZnS$—$CdS$, $ZnO$, or $Nb_2O_5$ or other known photocatalytic agent.

In some embodiments, the catalytic activity is provided by Anatase titanium dioxide, a photocatalytic semiconducting material. Anatase is known to produce hydroxyl radicals and other oxidizing species in the presence of UVA (400 nm) light.

Biochemical Properties

In some embodiments, the dental appliance comprises a dental/periodontal or cosmetic treatment modality in the form of a component having antibacterial activity. In some embodiments, the antibacterial activity of MA1 is greater than the antibacterial activity of MA2.

In some embodiments the calcium binding capacity of MA1 is greater than the calcium binding capacity of MA2. Is some embodiments MA1 has greater mineralizing activity than MA2. In some embodiments the calcium transport property of MA2 is greater than the calcium transport property of MA1.

The dental appliances or shells may vary in terms of fluid permeability. This can be optimized by varying the diameter and the density of pores. The pore density and diameter can be of uniform or non-uniform distribution across the dental appliance or shell. The dental appliances or shells may vary in terms of oxygen permeability and/or fluid permeability.

In some embodiments, the oxygen permeability of MA2 is greater than MA1. In some embodiments the rate of saliva transport is greater for MA1 than MA2.

In some embodiments, the dental appliance comprises at least a first or innermost component and a second or outermost component.

In some embodiments, a first or innermost component of the dental appliance or shell more closely tracks the conformation of the teeth than the second or outermost component. In some embodiments the first or innermost component has a thinner wall thickness than a second or outermost component.

In some embodiments, the innermost and outermost components comprise similar or the same materials.

In some embodiments, at least a portion of the innermost component fitting over the teeth is trimmed to the gum line such that there is little to no coverage of the gingiva. In some embodiments substantially, all of the innermost material is trimmed to the gum line over the region which is readily visible to an observer when the appliance is worn. In some embodiments some of the innermost materials are not trimmed to the gum line over a region which is not readily visible to an observer when the appliance is worn (e.g., the back of the teeth). In some cases, the innermost component fitting over the teeth comprises more than one layer or more than one material and has a thickness as shown in Table 3.

TABLE 3

Exemplary Thickness Ranges for Innermost Component of Dental Appliances.

| Minimum (mm) | Maximum (mm) |
|---|---|
| 0.0125 | 0.75 |
| 0.0125 | 0.5 |

TABLE 3-continued

Exemplary Thickness Ranges for Innermost Component of Dental Appliances.

| Minimum (mm) | Maximum (mm) |
|---|---|
| 0.0125 | 0.25 |
| 0.0125 | 0.05 |
| 0.025 | 0.75 |
| 0.025 | 0.5 |
| 0.025 | 0.25 |
| 0.025 | 0.125 |
| 0.025 | 0.05 |
| 0.125 | 0.5 |
| 0.125 | 0.25 |

In some embodiments, a second or outermost component of the dental appliance or shell has less contours (i.e., is less conformal) than the first or inner component. In one embodiment, the outer component is not coextensive with teeth, may be transparent or translucent and has a thickness as shown in Table 4.

TABLE 4

Exemplary Thickness Ranges for Outermost Component of Dental Appliances.

| Minimum (mm) | Maximum (mm) |
|---|---|
| 0.125 | 1 |
| 0.25 | 1 |
| 0.375 | 1 |
| 0.5 | 1 |
| 0.75 | 1 |
| 0.125 | 0.75 |
| 0.25 | 0.75 |
| 0.375 | 0.75 |
| 0.5 | 0.75 |
| 0.125 | 0.5 |
| 0.25 | 0.5 |
| 0.375 | 0.5 |

In some embodiments, a second or outermost component of the dental appliance is one or more of thicker, stronger, and more transparent than the first or innermost component of the dental appliance.

In some embodiments, the components of the dental appliance are attached or laminated to one another.

In some embodiments, the outermost component is not trimmed to gum line and extends over the gum line, for example, 1 mm, 2 mm, 3 mm, 4 mm, 5 mm, 6 mm, 7 mm, 10 mm, 1 to 3 mm, 2 to 4 mm, 4 to 6 mm, 5 to 6 mm, 6 to 7 mm, 7 to 8 mm, 8 to 9 mm, or 9 to 10 mm over the gum line.

In some embodiments, the components of the dental appliance may or may not be layers, and the material that extends beyond the gum line is not the same as the material that covers the teeth.

In some embodiments, the components of the dental appliance may or may not be layers, and the material that extends beyond the gum line is the same as the material the covers the teeth.

In some embodiments the dental appliance shells are of variable thickness, for example, 0.2 mm, 0.3 mm, 0.4 mm, 0.5 mm, 0.6 mm, 0.7 mm, 0.8 mm, 0.9 mm, 1.0 mm, 1.1 mm, 1.2 mm, 1.3 mm, 1.4 mm, 1.5 mm, from 0.2 mm to 0.6 mm, from 0.4 mm to 0.8 mm, from 0.6 mm to 1.0 mm, from 0.8 mm to 1.2 mm, or from 1.0 mm to 1.4 mm. The thickness may vary for different portions of the dental appliance or shell either by design or as a result of the manufacturing process.

In some embodiments, the polymer in a material used to make the dental appliance or shell is a homopolymer, or a random, block or a graft copolymer. The composition can contain a single polymer or a mixture of two or more polymers. Generally, the polymer is substantially transparent. In some embodiments, the optical characteristics of the dental appliance or shell are dominated by optical additives which are mixed with the polymer. In some embodiments, the polymer is a semicrystalline polymer which scatters light.

The devices described herein may be prepared from any suitable plastic or polymeric resin, examples of which are listed in Table 5. The shell material may be a thermoplastic or a thermoset resin.

In some embodiments, the polymer can optionally have one or more of the following characteristics (i.e., a single one of the following characteristics or any possible combination of two or more of the following characteristics).

In some embodiments, the polymer comprises a thermoplastic polymer.

In some embodiments, the polymer comprises a thermoset polymer.

In some embodiments, the polymer is an elastomer, preferably an elastomer having elongation to break greater than 200% and a 100% modulus of less than 25 MPA.

TABLE 5

Exemplary Polymers for use in Making Dental Appliances.

| Type of Polymer | Exemplary Polymers | Exemplary Co-polymers |
|---|---|---|
| Polyurethanes | rigid polyurethanes, for example reaction product of MDI and hexanediol, thermoplastic polyurethanes (TPU) elastomers | Reaction product of MDI, hexane di-isocyanate or H12 MDI and butanediol or hexane diol and polyols, silicone diols |
| Polyolefins | polyethylene, high-density polyethylene, (HDPE), low-density polyethylene (LDPE), medium density polyethylene, (MDPE), linear low density polyethylene (LLDPE), polypropylene, poly methyl pentene, polybutene | Ethylene copolymer with vinyl acetate, acrylic acid, methacrylic acid, methyl acrylate, ethyl acrylate, butyl acrylate, propylene, alpha olefins, ionomers such as ionomers containing sodium, lithium, zinc, potassium or magnesium ions |
| Acrylic and methacrylic polymers | Poly methymethacrylate (PMMA), Polybutyl methacrylate | Styrene acrylic co-polymer, styrene acrynotrile co-polymer |
| Polystyrenes | Polystyrene, poly alphamethylstyrene | styrene acrylics, styrene acrylonitrile, acrylonitrile butadiene styrenes (ABS), styrene block co-polymers, |
| Fluoropolymers | polyvinylidene fluoride (PVDF), polyvinyl fluoride, fluorinated ethylene propylene (FEP), polytetrafluroethylene | Tetrafluroethylene propylene copolymer, poly chloro trifluormethyl ethylene |
| Polyamides | Nylon 6-6, nylon 11, nylon 12 | Nylon 6-66, nylon 410 cycloaliphatic or aromatic polyamides |
| Polyethers | Polyoxymethylene | |
| Polyester | Polyethylene terephthalate Polyethylene naphthenate | Polyethylene terephthalate glycol |

In some embodiments, the dental appliance or shell is prepared by thermoforming one more materials which are or are not of uniform thickness, for example by thermoforming one or more materials over a model of the teeth to which the dental appliance is to be fitted.

The polymeric materials in the dental appliance may comprise two or more different polymeric materials, such as a polymer disclosed above, and one or more additives.

In some embodiments, a material, for example, an elastomeric polyurethane, is provided in the form of a uniform sheet having a thickness of 0.5 mm, 0.625 mm, 0.76 mm, 1.0 mm, from 0.40 to 0.55 mm, from 0.55 to 0.65 mm, from 0.65 to 0.76 mm, from 0.76 mm to 1.0 mm, or from 1.0 mm to 1.1 mm. In other cases, the material is provided in the form of discs, squares, triangles or other shapes of the material having a thickness of 0.5 mm, 0.625 mm, 0.76 mm, 1.0 mm, from 0.40 to 0.55 mm, from 0.55 to 0.65 mm, from 0.65 to 0.76 mm, from 0.76 mm to 1.0 mm, or from 1.0 mm to 1.1 mm.

In some embodiments, a material, for example, a rigid polyurethane (for example, Zendura A, Bay Materials LLC), is provided in the form of a uniform sheet having a thickness of 0.5 mm, 0.625 mm, 0.76 mm, 1.0 mm, from 0.40 to 0.55 mm, from 0.55 to 0.65 mm, from 0.65 to 0.76 mm, from 0.76 mm to 1.0 mm, or from 1.0 mm to 1.1 mm. In other cases, the material is provided in the form of discs, squares, triangles or other shapes of the material having a thickness of 0.5 mm, 0.625 mm, 0.76 mm, 1.0 mm, from 0.40 to 0.55 mm, from 0.55 to 0.65 mm, from 0.65 to 0.76 mm, from 0.76 mm to 1.0 mm, or from 1.0mm to 1.1 mm.

In some embodiments, a material, for example, polymethyl pentene (e.g., TPX) or polyethylene terephthalate glycol (PETG) is provided in the form of a uniform sheet or discs, squares, triangles or other shapes of the material having a thickness of 0.4 mm, 0.5 mm, 0.625 mm, 0.76 mm, 1.0 mm, from 0.3 to 0.4 mm, from 0.4 to 0.5 mm, from 0.5 to 0.6 mm, from 0.6 to 0.7mm or from 0.7 mm to 1.0 mm. (maybe we can condense as the "polymer" and the thickness are essentially independent variables In some embodiments, it is preferred that the teeth are natural looking and as white as desired by the patient or individual whose teeth are being treated. In such cases, it is preferable that one material used to make the dental appliance comprise one or more additives that provide the appropriate color to the teeth.

In some embodiments, a material for example, pigment-containing rigid polyurethane, is provided in the form of a uniform sheet, or discs, squares, triangles or other shapes of the material having a thickness of 0.0125, 0.025, 0.05, 0.125, 0.25, 0.5 mm, from 0.125mm to 0.5mm, from 0.05 to 0.5 mm, 0.125 to 0.5 mm In some embodiments, a material, for example, a polyurethane treated with Anatase, Zeolite or another agent is provided in the form of a uniform sheet, discs, squares, triangles or other shapes of material having a thickness of 0.125 mm, 0.25 mm, 0.3 mm, 0.35 mm, 0.4 mm, 0.45 mm, 0.5 mm, from 0.125 to 0.3 mm, from 0.25 to 0.4 mm, or from 0.4 to 0.5 mm.

The polymeric materials described herein, can be prepared by conventional methods well-known to those skilled in the art of polymer technology. In general, a polymeric dental appliance is produced by shaping, e.g., thermoforming a polymeric sheet of a selected material over a model of the teeth. In some cases, one or more additional materials are thermoformed over a model of the teeth resulting in a laminate. In some embodiments, the dental appliance is a composite. In some embodiments, the dental appliance is 3D printed. In some embodiments, the dental appliance is produced by spraying a polymer solution over a model or dip coating.

EXAMPLES

The compositions and methods are further illustrated by the following examples. The examples are provided for illustrative purposes only. They are not to be construed as limiting the scope or content of the described subject matter in any way.

Materials and Methods.

Figure 2A:
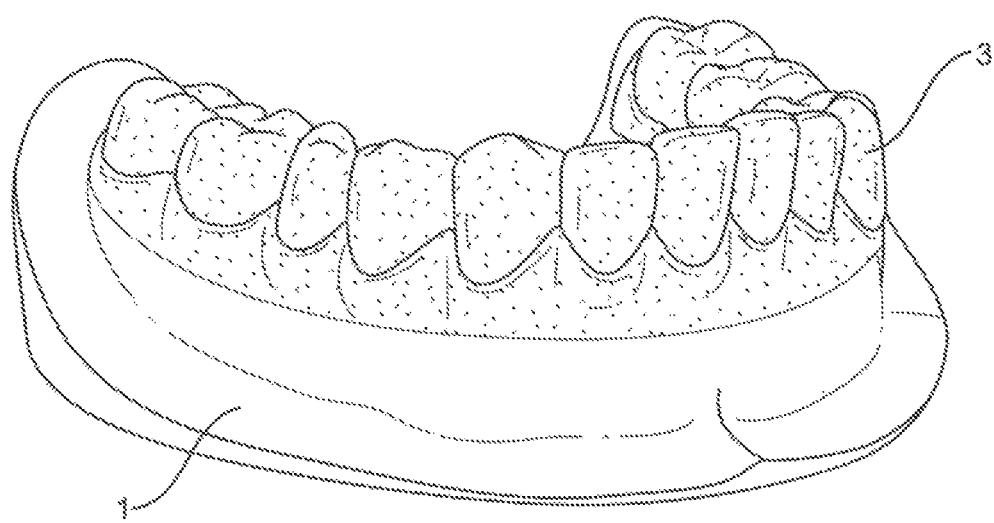
FIG. 2A is a schematic depiction of a first or innermost polymeric material thermoformed over a cast model of the teeth.
Figure 2B:
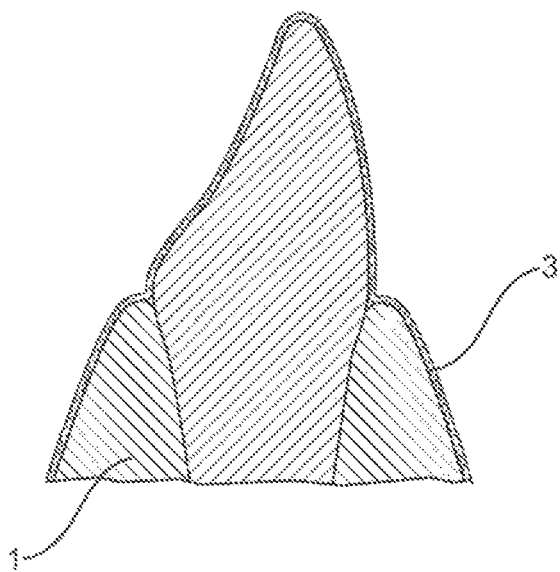
FIG. 2B is a schematic depiction of a side view of single tooth showing a first or innermost polymeric material thermoformed over the tooth.

A tooth model as shown in FIG. 1 is created by casting dental stone using a silicone dental impression according to standard methods routinely employed in the art. The cast model is trimmed, and imperfections repaired. Alternatively, a model is produced by 3D printing or stereolithographic printing (SLA).

A series of elastomeric polyurethane sheets 0.5 mm (B1), 0.625 (B2), 0.76 (B3), and 1.0 (B4) mm having a durometer of 55D were prepared by extrusion of Pellethane 2363-55D (Lubrizol) using a ¾" extruder and flat sheet die.

Pre-dried discs or sheets of ZENDURA A, 0.25 mm (C1), 0.5 mm (C2), 0.625 (C3), 0.76 (C4), and 1.0 (C5) thick rigid polyurethane were provided (Bay Materials, LLC).

Example 1

Evaluation of Perceived Color

A series of lightly pigmented rigid polyurethane films (D, E, F, G) of varying thickness were prepared by extrusion of a blend of Isoplast 2530 White (Lubrizol) having an estimated
1.5% titanium dioxide pigment and Isoplast 2530 (Lubrizol). The ability of the films to alter the perceived color of both a black color tile and a yellow color tile were measured using a Byk Gardner Colorimeter as follows. Color measurement was made directly on color tiles and the LAB color values were recorded. Next, a thin film of water was applied to the color tile and the test film was laid onto the tile and gently smoothed to remove excess water to provide good optical coupling between the film and the color tile. The color measurements were then repeated, measuring the combined structure and the LAB color values recorded. Film composition, structure and measured color values are shown in Tables 6 and 7.

TABLE 6

Film Composition, Structure and Measured Color Values on Black Color Tile.

| | Plastic Film | | Color Readings on Black Color Tile | | | | |
| --- | --- | --- | --- | --- | --- | --- | --- |
| Film ID | Thickness (microns) | % Isoplast White | L | A | B | Delta L | Delta B |
| NA | None | None | 29.88 | 0.08 | 0.95 | 0 | 0 |
| D | 37.5 | 50 | 50.54 | 1.1 | −5.18 | 20.66 | −6.13 |
| E | 50 | 100 | 62.9 | 1.71 | −5.69 | 33.02 | −6.64 |
| F | 50 | 50 | 51.9 | 1.16 | −5.41 | 22.02 | −6.36 |
| G | 75 | 50 | 58.75 | 1.56 | −5.73 | 28.87 | −6.68 |

TABLE 7

Film Composition, Structure and Measured Color Values on Yellow Color Tile.

| | | | Color Readings on Yellow Color Tile | | | | |
| --- | --- | --- | --- | --- | --- | --- | --- |
| Film ID | Thickness (microns) | % Isoplast White | L | A | B | Delta L | Delta B |
| NA | None | None | 77.81 | 3.2 | 23.46 | 0 | 0 |
| D | 37.5 | 50 | 79.6 | 3 | 15.59 | 1.79 | −7.87 |
| E | 50 | 100 | 81.6 | 2.44 | 10.91 | 3.79 | −12.55 |
| F | 50 | 50 | 79.7 | 2.99 | 15.84 | 1.89 | −7.62 |
| G | 75 | 50 | 80.6 | 2.7 | 12.87 | 2.79 | −10.59 |

In each case the translucent lightly pigmented films increased the "brightness" as shown by the L values and decreased the yellowness of the tiles as shown by the B values.

Example 2

Use of Dental Appliances for Application of a Decomposition Catalyst.

Zeolite Socony Mobil-5 (Zeolite SM-5) is an aluminosilicate zeolite belonging to the pentasil family of zeolites. Its chemical formula is $Na_nAl_nSi_{96-n}O_{192} \cdot 16H_2O$ (0<n<27) and is available from multiple sources. This Zeolite is insoluble, non-toxic and known to catalyze the decomposition of peroxides such as hydrogen peroxide producing oxidizing species including hydroxy radicals. 100 grams of Zeolite SM-5 was dry milled in a ball mill for 8 hours to provide a finely divided powder which was sieved and the fraction passing through a 20-micron sieve was collected, washed, filtered and dried.

A 2% w/w solution of polyvinyl alcohol (PVA) was prepared by dissolving Evanol 75-15 (Kuraray) in hot water followed by cooling. To 100 ml of a 2% PVA solution was added 5 grams of powdered SM-5 Zeolite and one drop of Surfynol 104 surfactant (Air Products). The mixture was stirred with a high speed overhead mixer for 30 minutes. Sheets of transparent rigid polyurethane (Bay Materials, LLC) were coated with the PVA-Zeolite solution using a wire wound rod. After the coated solution evaporated the sheets were places initially in an 80 C oven for 4 hours, and then moved to a 100 C oven for 3 hours. Sheets were then placed between layers of oriented polyester film and briefly heated to 120 C in a heated press under moderate pressure to bond the zeolite into the surface of the polymer. The resulting Zeolite SM-5 impregnated polyurethane sheets have an approximate thickness of 0.25 mm (H1) and 0.76 mm (H2).

Example 3

Use of Dental Appliances for Application of a Photochemically Active Bleaching Catalyst A 2% w/w solution of polyvinyl alcohol (PVA) was prepared by dissolving Evanol 75-15 (Kuraray) in hot water followed by cooling. To 100 ml of a 2% PVA solution was added 10 grams of submicron particle size Anatase titanium dioxide a photocatalytic semiconducting material. Anatase is known to produce hydroxyl radicals and other oxidizing species in the presence of UVA (400 nm) light. The mixture was stirred with a high speed overhead mixer for 30 minutes. Sheets of transparent rigid polyurethane (Bay Materials, LLC) were coated with the PVA-Anatase solution using a wire wound rod. After the coated solution evaporated the sheets were places initially in an 80 C oven for 4 hours, and then moved to a 100 C oven for 3 hours. Sheets were then placed between layers of oriented polyester film and briefly heated to 120 C in a heated press under moderate pressure to bond the zeolite into the surface of the polymer. PVA-Anatase treated polyurethane sheets were thus prepared using polyurethane sheets having an approximate thickness of 0.25 mm (J1) and 0.76 mm (J2).

Example 4

Thermoforming Dental Appliances

Figure 3A:
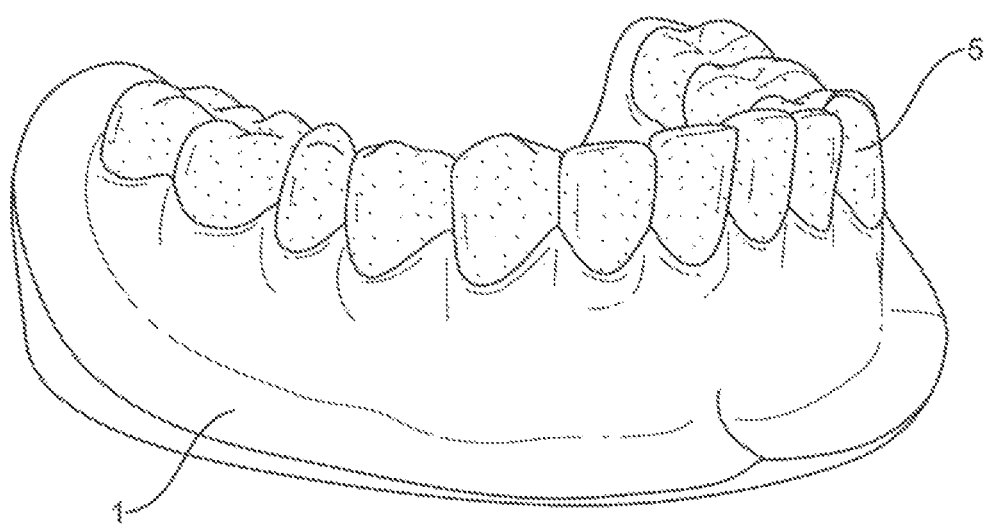
FIG. 3A is a schematic depiction of a first or innermost polymeric material thermoformed over a cast model of the teeth, where the polymeric material is carefully trimmed very close to the gum line and closely following the shape of teeth.
Figure 3B:
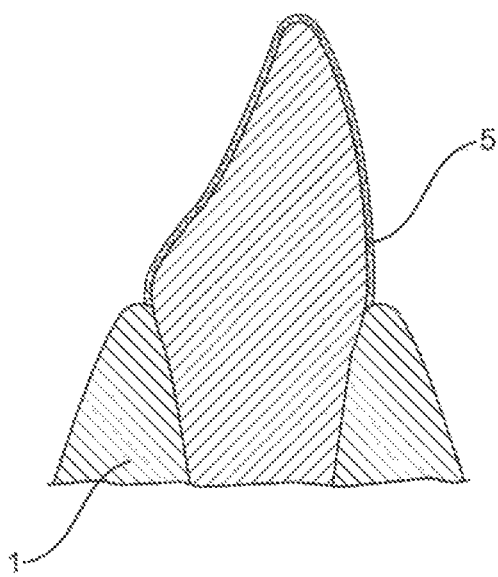
FIG. 3B is a schematic depiction of a side view of a single tooth showing a first or innermost polymeric material thermoformed over the tooth, where the polymeric material is carefully trimmed very close to the gum line and closely following the shape of the tooth.
Figure 4A:
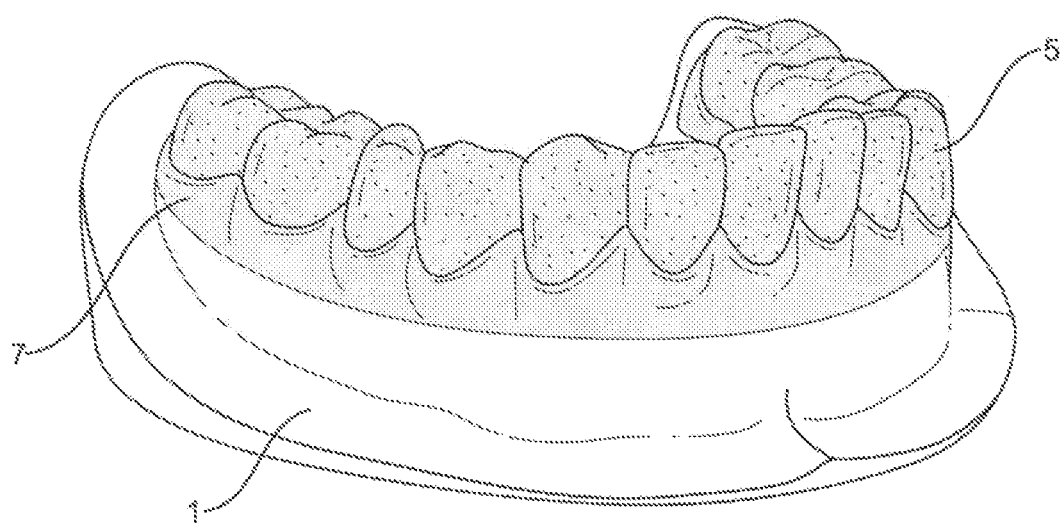
FIG. 4A is a schematic depiction of a first or innermost polymeric material thermoformed over a cast model of the teeth, carefully trimmed very close to the gum line and placed back on the model to create a dental appliance where the polymeric material part does not extend beyond the tooth area. A second or outermost polymeric material was thermoformed over the appliance resulting in a laminated structure, where the outermost material extends over the gum line.
Figure 4B:
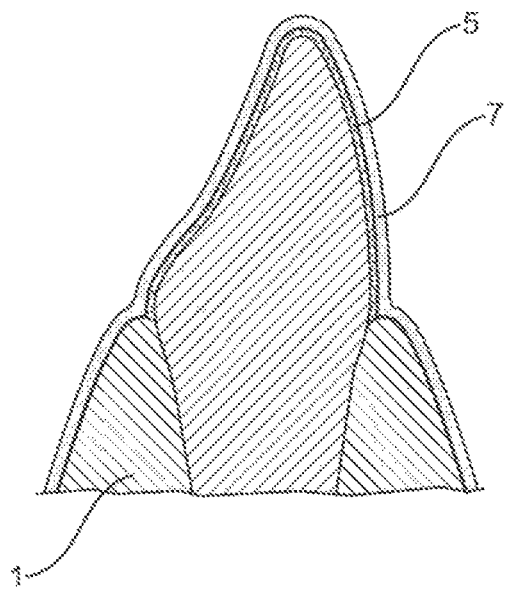
FIG. 4B is a schematic depiction of a side view of single tooth showing a first or innermost polymeric material thermoformed over the tooth, carefully trimmed very close to the gum line with a second or outermost polymeric material thermoformed over the first or innermost polymeric material resulting in a laminated structure, where the outermost material extends over the gum line.
Figure 5A:
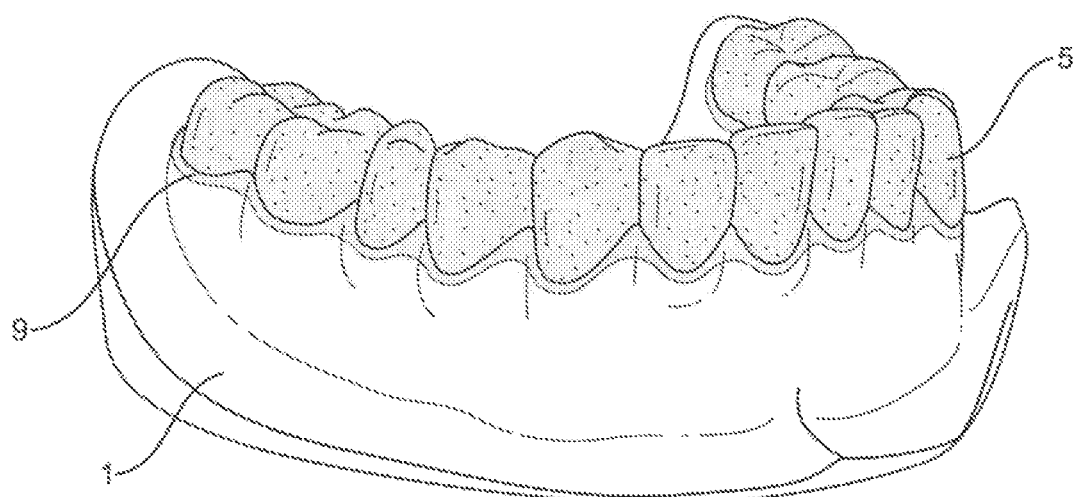
FIG. 5A is a schematic depiction of a first or innermost polymeric material thermoformed over a cast model of the teeth, carefully trimmed very close to the gum line and placed back on the model to create a dental appliance where the polymeric material part does not extend beyond the tooth area. A second or outermost polymeric material was thermoformed over the appliance resulting in a laminated structure and trimmed approximately 2 mm beyond the gum line generally conforming to the edge of the teeth.
Figure 5B:
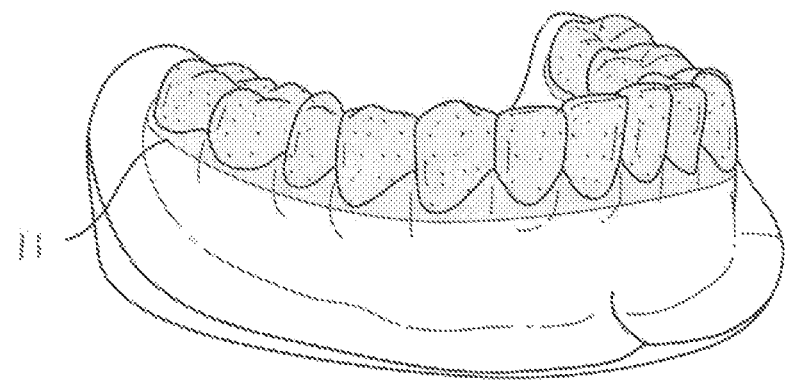
FIG. 5B is a schematic depiction of a first or innermost polymeric material thermoformed over a cast model of the teeth, carefully trimmed very close to the gum line and placed back on the model to create a dental appliance where the polymeric material part does not extend beyond the tooth area. A second or outermost polymeric material was thermoformed over the appliance resulting in a laminated structure and trimmed approximately 2 mm beyond the gum line with a substantially straight edge, not directly conforming to the contours of the teeth.
Figure 5C:
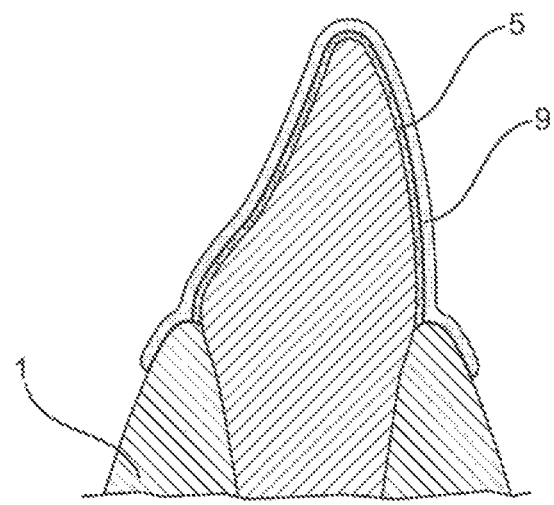
FIG. 5C is a schematic depiction of a side view of single tooth showing a first or innermost polymeric material thermoformed over the tooth, carefully trimmed very close to the gum line with a second or outermost polymeric material thermoformed over the first or innermost polymeric material resulting in a laminated structure, where the second material is trimmed approximately 2 mm beyond the gum line.

A tooth model of the upper teeth of an individual was placed in a Biostar pressure forming machine and a 0.5 mm thick sheet of rigid polyurethane (C2) was thermoformed over the model. The thermoformed sheet was removed from the model and carefully trimmed very close to the gum line, as shown in FIG. 3A, and placed back on the model. The molded part did not extend beyond the tooth area. Next a 0.5 mm thick sheet of polyurethane elastomer (B1) was thermoformed over the appliance resulting in a laminated structure. The dental appliance was removed from the model and trimmed approximately 2 mm beyond the gum line over most of the dental appliance, as shown in FIG. 5A (dental appliance 1). This dental appliance can be used as a retainer to maintain teeth in their correct position.

A tooth model of the upper teeth of an individual was placed in a Biostar pressure forming machine and a 1 mm thick sheet of rigid polyurethane (C5) was thermoformed over the model. The thermoformed sheet was removed from the model and carefully trimmed very close to the gum line, as shown in FIG. 3A (dental appliance 2a). The process was repeated except that the thermoformed sheet was trimmed about 2 mm below (beyond) the gum line over most of the dental appliance, as shown in FIG. 5A (dental appliance 2b). The process was again repeated but using a 1 mm thick sheet of polyurethane elastomer (B4) which was molded and trimmed at the gum line (dental appliance 2c).

TABLE 8

Evaluation of Dental Appliances for Function and Comfort.

| Dental Appliance | Functional Evaluation | Comfort Evaluation |
| --- | --- | --- |
| 1 | Good | Good - No irritation, easy to remove |
| 2a | Good | Poor, sharp edges |
| 2b | Good | Poor, pressure on gums and difficult to remove |
| 2c | Poor, insufficient force to maintain tooth position | Good |

Dental Appliances 2a, 2b and 2c are examples of prior art devices. The results presented in Table 3 highlight the deficiencies of the materials used to make currently available dental appliances and the advantages of the present devices.

Example 5

A tooth model of the upper teeth of an individual was placed in a Biostar pressure forming machine and a 0.05 mm thick sheet of pigment containing rigid polyurethane (E) was thermoformed over the model. The thermoformed sheet was removed from the model and carefully trimmed very close to the gum line, as shown in FIG. 3A, and placed back on the model. The molded part did not extend beyond the tooth area. Next a 0.76 mm thick sheet of rigid polyurethane (C4) was thermoformed over the appliance resulting in a laminated structure. The dental appliance was removed from the model and trimmed approximately 2 mm beyond the gum line over most of the dental appliance, as shown in FIG. 5A (dental appliance 3).

Example 6

A model of the upper teeth of an individual (A) was placed in a Biostar pressure forming machine and a 0.05 mm thick sheet of pigment containing rigid polyurethane (E) was thermoformed over the model. Next a 0.76 mm thick sheet of rigid polyurethane (C4) was thermoformed over the appliance resulting in a laminated structure. The dental appliance was removed from the model and trimmed approximately 2 mm beyond the gum line over most of the dental appliance. (dental appliance 4)

A model of the upper teeth of an individual (A) was placed in a Biostar pressure forming machine and a 0.05 mm thick sheet of pigment containing rigid polyurethane (E) was thermoformed over the model. Next a 0.76 mm thick sheet of rigid polyurethane (C4) was thermoformed over the appliance resulting in a laminated structure. The dental appliance was removed from the model and trimmed at the gum line over most of the dental appliance. (dental appliance 5)

TABLE 9

Evaluation of Dental Appliances for Aesthetics and Function.

| Dental appliance | Whitening Effect | Aesthetic and Functional Effect |
| --- | --- | --- |
| 3 | Excellent | Excellent |
| 4 | Excellent | Very poor. White component over gums dramatically impairs aesthetics. |
| 5 | Excellent | Poor, dental appliance does not completely match tooth line and sharp edges are prone to cracking and irritation of gum. |

Example 7

Dental appliances were prepared in the manner and construction of dental appliance 3 using each of film D, E, F, and G (a series of thin, lightly pigmented rigid polyurethane films; dental appliances 6, 7, 8, 9). An additional dental appliance was made using two layers of film E followed by one layer of (C) and then trimming 2 mm beyond the gum line (dental appliance 10).

TABLE 10

Evaluation of Dental Appliances for Aesthetics and Whitening Effect.

| Dental appliance | Aesthetic and Whitening Effect | Functional Effect |
| --- | --- | --- |
| 6 | Good | Excellent |
| 7 | Excellent | Excellent |
| 8 | Good | Excellent |
| 9 | Very good | Excellent |
| 10 | Too white, looks unnatural | Excellent |

Example 8

Polymethyl pentene is a transparent polymer available under the trade name TPX from Mistui Chemical. Polymethyl pentene has very high oxygen permeability, approximately 100 times greater than polyethylene terephthalate glycol (PETG) a material commonly used to make dental appliances such as aligners and retainers. PETG sheets may be obtained from Great Lakes Orthodontics. DX310 grade of TPX was extruded to produce sheet having a thickness of 0.5 mm (L).

A model of the upper teeth of an individual (A) was placed in a Biostar pressure forming machine and a 0.5 mm thick sheet of PETG was thermoformed over the model. The dental appliance was removed from the model, trimmed at the gum line and placed back on the Model. Next a 0.5 mm thick sheet of TPX (L) was thermoformed over the appliance resulting in a laminated structure. The dental appliance was removed from the model and trimmed approximately 2 mm below (beyond) the gum line over most of the dental appliance to provide an appliance having increased oxygen permeation over the gum line (dental appliance 11).

Example 9

A model of the upper teeth of an individual (A) was placed in a Biostar pressure forming machine and a 0.25 mm thick sheet of anatase impregnated polyurethane (J1) was thermoformed over the model. The dental appliance was removed from the model, trimmed at the gum line and placed back on the Model. Next a 0.625 mm thick sheet of polyurethane elastomer (B2) was thermoformed over the appliance resulting in a laminated structure. The dental appliance was removed from the model and trimmed approximately 2 mm below (beyond) the gum line (dental appliance 11).

When exposed to ordinary sunlight this dental appliance can whiten teeth without the need for added peroxides or chemicals. It is thought that the mode of action is photo-generated hydroxyl radicals. Additionally, essentially all of the whitening activity occurs at the tooth surface and exposure of the gum tissue to potentially harmful hydroxyl radicals is minimized.

Example 10

A model of the upper teeth of an individual (A) was placed in a Biostar pressure forming machine and a 0.25 mm thick sheet of Zeolite SM-5 impregnated polyurethane (H1) was thermoformed over the model. The dental appliance was removed from the model, trimmed at the gum line and placed back on the Model. Next a 0.625 mm thick sheet of polyurethane elastomer (B2) was thermoformed over the appliance resulting in a laminated structure. The dental appliance was removed from the model and trimmed approximately 2 mm below (beyond) the gum line. (dental appliance 12)

This dental appliance can be utilized as a bleaching tray in combination with one or more peroxy compounds, for example hydrogen peroxide or carbamide peroxide. Peroxy compounds put inside the tray selectively decompose at the surface of the teeth generate strong whitening effects without need for acceleration by light or other means. Additionally, it is observed that the peroxide activation occurs selectively at the tooth surface relative to the gingival area resulting in less irritation to gum tissue.

TABLE 11

Numbering for Figures.

| Number | Description |
|---|---|
| 1 | Cast model of teeth of an individual |
| 3 | First or innermost polymeric material thermoformed over cast model of teeth (not trimmed). |
| 5 | First or innermost polymeric material thermoformed over cast model of teeth and carefully trimmed very close to the gum line. |
| 7 | Outermost polymeric material thermoformed over cast model of teeth (not trimmed). |
| 9 | Outermost polymeric material thermoformed over cast model of teeth and trimmed approximately 2 mm beyond the gum line over most of the dental appliance with the edge conforming to the contours of the teeth. |
| 11 | Outermost polymeric material thermoformed over cast model of teeth and trimmed approximately 2 mm beyond the gum line over most of the dental appliance in a substantially straight line. |

In the Brief Summary, the Detailed Description, the Examples, the Statements and the claims below, and the accompanying drawings, reference is made to particular features. These features can for example be components, ingredients, elements, devices, apparatus, systems, groups, ranges, method steps, test results and instructions, including program instructions.

It is to be understood that the disclosure in this specification includes all possible combinations of such particular features. For example, where a particular feature is disclosed in the context of a particular aspect or embodiment, or a particular claim, or a particular Figure, that feature can also be used in combination with and/or in the context of other particular aspects, embodiments, claims and Figures, except where the context excludes that possibility.

The subject matter disclosed herein, and the claims, include embodiments not specifically described herein and can for example make use of features which are not specifically described herein, but which provide functions which are the same, equivalent or similar to, features specifically disclosed herein.

The term "comprises", and grammatical equivalents thereof are used herein to mean that, in addition to the features specifically identified, other features are optionally present. For example, a composition or device "comprising" (or "which comprises") components A, B and C can contain only components A, B and C, or can contain not only components A, B and C but also one or more other components.

When a range is given as "(a first number) to (a second number)" or "(a first number)-(a second number)", this means a range whose lower limit is the first number and whose upper limit is the second number. For example, "from 8 to 20 carbon atoms" or "8-20 carbon atoms" means a range whose lower limit is 8 carbon atoms, and whose upper limit is 20 carbon atoms. The terms "plural", "multiple", "plurality" and "multiplicity" are used herein to denote two or more than two features.

Where reference is made herein to a method comprising two or more defined steps, the defined steps can be carried out in any order or simultaneously (except where the context excludes that possibility), and the method can optionally include one or more other steps which are carried out before any of the defined steps, between two of the defined steps, or after all the defined steps, except where the context excludes that possibility.

Where reference is made herein to "first" and "second" features, this is generally done for identification purposes; unless the context requires otherwise, the first and second features can be the same or different, and reference to a first feature does not mean that a second feature is necessarily present (though it may be present).

Where reference is made herein to "a" or "an" feature, this includes the possibility that there are two or more such features (except where the context excludes that possibility). Thus, there may be a single such feature or a plurality of such features. Where reference is made herein to two or more features, this includes the possibility that the two or more features are replaced by a lesser number or greater number of features which provide the same function, except where the context excludes that possibility.

The term "and/or" is used herein to mean the presence of either or both of the two possibilities stated before and after "and/or", The possibilities can for example be components, ingredients, elements, devices, apparatus, systems, groups, ranges and steps) is present. For example, "item A and/or item B" discloses three possibilities, namely (1) only item A is present, (2) only item B is present, and (3) both item A and item B are present.

Where this specification refers to a component "selected from the group consisting of" two or more specified sub-components, the selected component can be a single one of the specified sub-components or a mixture of two or more of the specified sub-components.

What is claimed is:

1. A dental appliance which exerts a functional effect when applied to the teeth of a subject, the dental appliance comprising:
   (a) a first or innermost component made of a first material adapted to conform to both lingual and buccal sides of at least a portion of an exposed portion of the teeth,
   (b) a second or outermost component made of a second material that is different from the first material, where at least a portion of the second component is trimmed to 1 to 2.5 mm beyond the gum line, and wherein at least a portion of the first material has at least one property that is different from at least a portion of the second material, said at least one property selected from:
      (i) an optical property,
      (ii) oxygen permeability,
      (iii) fluid permeability,
      (iv) antibacterial activity,
      (v) calcium binding capacity,
      (vi) catalytic activity for decomposition of a peroxy compound, and
      (vii) photocatalytic activity;
   wherein the first or innermost component and the second or outermost component are continuous layers.

2. The dental appliance of claim 1, wherein the first or innermost layer does not overlap the adjacent gingival area.

3. The dental appliance of claim 2, wherein the optical property is selected from visible light transmission, reflection, anti-glare, gloss control, haze and color.

4. The dental appliance of claim 3, wherein the visible light transmission of the first or innermost layer is less than the visible light transmission of the second or outermost layer.

5. The dental appliance of claim 3, wherein the visible light transmission of the first or innermost layer is less than 80%, and the visible light transmission of the second or outermost layer is greater than 70%.

6. The dental appliance of claim 3, wherein:
   (a') the oxygen permeability of at least the portion of the second material or outermost layer is greater than the oxygen permeability of at least the portion of the first material or innermost layer, or
   (b') the fluid permeability of at least the portion of the first material or innermost layer is greater than the fluid permeability of at least the portion of the second material or outermost layer, or
   (c') the antibacterial activity of at least the portion of the first material or innermost layer is greater than the antibacterial activity of at least the portion of the second material or outermost layer, or
   (d') the calcium binding capacity of the first material or innermost layer is greater than the calcium binding capacity of the second material or outermost layer.

7. The dental appliance of claim 1, wherein the first or innermost layer is thermoformed to fit over an exposed portion of the teeth and wherein the innermost layer does not overlap the corresponding adjacent gingival area.

8. The dental appliance of claim 1, wherein the thickness of the first or innermost layer is from 0.0125 to 0.75 mm, 0.0125 to 0.5 mm, 0.0125 to 0.25 mm, 0.0125 to 0.05 mm, 0.025 to 0.75 mm, 0.025 to 0.5 mm, 0.025 to 0.25 mm, 0.025 to 0.125 mm, 0.025 to 0.05 mm, 0.125 to 0.5 mm, or 0.125 to 0.25 mm.

9. The dental appliance of claim 1, wherein the thickness of the second or outermost layer is from 0.125 to 1 mm, 0.25 to 1 mm, 0.375 to 1 mm, 0.5 to 1 mm, 0.75 to 1 mm, 0.125 to 0.75 mm, 0.25 to 0.75 mm, 0.375 to 0.75 mm, 0.5 to 0.75 mm, 0.125 to 0.5 mm, 0.25 to 0.5 mm, or 0.375 to 0.5 mm.

10. The dental appliance of claim 1, wherein the first or innermost layer and the second or outermost layer are attached or laminated to one another.

11. The dental appliance of claim 1, further wherein at least a portion of the first or innermost layer possesses a catalytic activity for decomposition of a peroxy compound that is greater than the catalytic activity for decomposition of a peroxy compound of at least a portion of the second or outermost layer.

12. The dental appliance of claim 11, wherein:
   (a) the catalytic activity for decomposition of a peroxy compound is derived from:
      (i) one or more of an iron, nickel or manganese compound,
      (ii) a heterogeneous catalyst,
      (iii) an aluminosilicate zeolite, or
      (iv) magnetically separable iron mixed oxides, and
   (b) at least a portion of the first or innermost-layer possesses a photocatalytic activity that is greater than the photocatalytic activity of at least a portion of the second or outermost layer.

13. The dental appliance of claim 1, wherein the second or outermost layer does not contact the teeth.

14. The dental appliance of claim 1, wherein the first material has at least one optical property different from the second material and wherein the second material has at least one antibacterial property or oxygen permeability property different from the first material.

15. A dental appliance comprising a single polymeric shell adapted to fit over the exposed portion of the teeth, wherein the single polymeric shell comprises a first or innermost layer made of a first material adapted to conform to both lingual and buccal sides of at least a portion of the exposed portion of the teeth, and a second or outermost layer made of a second material that is different from the first material, wherein the first or innermost layer and the second or outermost layer are continuous layers, wherein the second or outermost layer is adapted to conform to 1 to 2.5 mm beyond the gum line of a corresponding gingival area adjacent to the exposed portion of the teeth, wherein the dental appliance comprises:
  (a) a catalytic activity for decomposition of a peroxy compound, where the catalytic activity is derived from:
    (i) one or more of an iron, nickel or manganese compound,
    (ii) a heterogeneous catalyst,
    (iii) an aluminosilicate zeolite, or
    (iv) magnetically separable iron mixed oxides, or
  (b) a photocatalytic activity, where at least a portion of the first or innermost layer material possesses a photocatalytic activity that is greater than the photocatalytic activity of at least a portion of the second or outermost material.

* * * * *